United States Patent
Kim

(10) Patent No.: US 7,393,431 B2
(45) Date of Patent: *Jul. 1, 2008

(54) BUBBLE PLATE FOR ETCHING AND ETCHING APPARATUS USING THE SAME

(75) Inventor: Jong Soo Kim, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/252,540

(22) Filed: Sep. 24, 2002

(65) Prior Publication Data

US 2003/0057180 A1    Mar. 27, 2003

(30) Foreign Application Priority Data

Sep. 25, 2001    (KR)    .................... 10-2001-0059384

(51) Int. Cl.
*C23F 1/00* (2006.01)
*H01L 21/306* (2006.01)

(52) U.S. Cl. ................................. 156/345.11
(58) Field of Classification Search ............... 134/113; 156/345.11

See application file for complete search history.

(56) References Cited

U.S. PATENT DOCUMENTS

| | | | | |
|---|---|---|---|---|
| 3,259,049 A | * | 7/1966 | Uithoven | 134/102.2 |
| 3,598,315 A | * | 8/1971 | Seymour | 239/229 |
| 4,113,586 A | * | 9/1978 | Cook et al. | 205/574 |
| 4,190,481 A | * | 2/1980 | Goffredo | 156/345.15 |
| 5,766,493 A | | 6/1998 | Shin | |
| 5,835,176 A | | 11/1998 | Jeong et al. | |
| 6,197,209 B1 | | 3/2001 | Shin et al. | |
| 6,228,211 B1 | | 5/2001 | Jeong | |
| 6,286,526 B1 | * | 9/2001 | Hase et al. | 134/100.1 |
| 6,532,974 B2 | * | 3/2003 | Kashkoush et al. | 134/56 R |
| 6,615,848 B2 | * | 9/2003 | Coats | 134/22.11 |

FOREIGN PATENT DOCUMENTS

| | | |
|---|---|---|
| JP | 2138459 | 5/1990 |
| JP | 3022390 | 1/1991 |
| JP | 4116619 | 4/1992 |
| JP | 5249422 | 9/1993 |
| JP | 5249423 | 9/1993 |
| JP | 7168172 | 7/1995 |

OTHER PUBLICATIONS

"Polyvinyl resins" by Manson, in AccessScience@McGraw-Hill, http://www.accessscience.com, DOI 10. 1036/1097-8542.537500, last modified: Apr. 10, 2000.*

* cited by examiner

*Primary Examiner*—Parviz Hassanzadeh
*Assistant Examiner*—Maureen G Arancibia
(74) *Attorney, Agent, or Firm*—McKenna Long & Aldridge, LLP

(57) ABSTRACT

An etching apparatus is disclosed, in which a bubble plate includes a plurality of air tubes having a plurality of holes being arranged in a straight line, and a straight frame having an air path and being connected to both ends of the air tube. The etching apparatus of the present invention reduces the probability of prolonged exposure to harmful chemicals by workers. Additionally, the guide does not have to be separated from the etching apparatus to separate the bubble plate. The etching apparatus reduces the probability of etching inferiority and/or substrate damage caused by incorrect assembly.

12 Claims, 4 Drawing Sheets

BUBBLE PLATE FOR ETCHING AND ETCHING APPARATUS USING THE SAME

This application claims the benefit of Korean Patent Application No. P2001-59384 filed on Sep. 25, 2001, which is hereby incorporated by reference for all purposes as if fully set forth herein.

BACKGROUND OF THE INVENTION

1. Field of the Invention

The present invention relates to an etching apparatus for a liquid crystal display device and more particularly to an etching apparatus for uniformly etching a glass substrate.

2. Discussion of the Related Art

Significant research is being conducted on various flat display devices, for example, on liquid crystal display (LCD) devices, plasma display panels (PDP), electroluminescent displays (ELD), and vacuum fluorescent displays (VFD). The LCD device is one of the most commonly used flat display devices and active research is being pursued in this area.

The LCD device includes a liquid crystal layer formed between lower and upper glass substrates.

On the lower glass substrate a plurality of gate and data lines are arranged in a matrix of rows and columns and are spaced apart at a constant interval formed to define a plurality of pixel regions. A switching means in the form of a transistor, for example, a thin film transistor (TFT), is formed at the intersection of the gate and data lines and a pixel electrode is formed in the pixel region.

A black matrix, a color filter layer, and a common electrode are formed on the upper glass substrate. The black matrix prevents leakage of light to the gate lines, data lines, and the TFT region.

Small-sized and lightweight LCD devices for portable televisions, notebook computers, handhelds, personal digital assistants (PDAs) are becoming increasingly popular. Decreasing the weight of such devices is major purpose of technology development. To this end, there are specific efforts to decrease the weight of the LCD itself.

Various methods have been tried to decrease the weight and size of the LCD. However, limitations in the related art and the LCD structure limit the extent to which the weight and size of the main components of the LCD can be reduced.

The glass substrate is one of the most basic elements of the LCD and comprises most of the total weight of the LCD. Accordingly, process technologies are being developed to decrease the total weight of the LCD by decreasing the weight of the glass substrate.

In order to decrease the weight of the glass substrate, its thickness should be decreased preferentially. However, if the thickness decreases below a specific value, the glass substrate is broken during processing and/or cracks are generated. Accordingly, this is one of the limitations in decreasing the thickness of the glass substrate.

A method for decreasing the thickness of the glass substrate currently in wide use is to etch the glass substrate. This etching is performed after an LCD panel has been fabricated by dipping the glass substrate into an etching bath.

This method has disadvantages in that the glass substrate is disproportionately etched. The non-uniform etching is caused by foreign particles generated during the etch process, thereby creating an irregular and/or rough surface on the glass substrate. Additionally, if the substrate becomes uneven, a difference in transmissivity occurs as light passing through the substrate is refracted to an unintended path, thereby creating stains on a liquid crystal screen.

A method for solving the foregoing problems is disclosed in U.S. Pat. No. 6,228,211 B1, filed by the applicant on Sep. 3, 1999 and claiming priority to Korean Patent Application No. 1998-37000, filed by the applicant on Sep. 8, 1998, both of which are hereby incorporated by reference for all purposes as if fully set forth herein. In the process disclosed in U.S. Pat. No. 6,228,211 B1, impurities generated on the substrate during an etching process are eliminated using an etching apparatus having a bubble plate.

The etching apparatus with the bubble plate will be described in detail with reference to the accompanying drawings below.

FIG. 1 is a simplified sectional view of an etching apparatus of the related art disclosed in U.S. Pat. No. 6,228,211 B1. Referring to FIG. 1, the prior art etching device includes an etching tank 1, a bubble plate 3 formed inside the etching tank 1, and a porous plate 5 formed on the bubble plate 3. An etching solution mixing tank 9 is connected to the bubble plate 3 through an etching solution supply pipe 7. A buffer tank 13 is connected to the bubble plate 3 through the etching solution discharge pipe 11. An air supply pipe 15 is connected to the bubble plate 3 for providing air into the bubble plate.

The etching solution mixing tank 9 is connected to a deionized (DI) water supply part 17, an undiluted etching solution supply part 19, and the buffer tank 13. The etching solution mixing tank 9 can store DI water provided from the DI water supply part 17, the undiluted etching solution (e.g., HF) provided from the undiluted etching solution supply part 19, and purified etching solution provided from the buffer tank 13.

FIG. 2 is a plane view of the bubble plate 3 comprising a rectangular frame 20 and a plurality of air tubes 22 formed inside the rectangular frame 20.

The air tubes 22 have a plurality of holes 26 in their surfaces. The rectangular frame is connected to the air tubes 22 and includes an air path 24 and an air injection hole 28 for providing nitrogen gas and the like from the air supply pipe 15.

A guide 30 is formed on the four corners of the rectangular frame 20 of the bubble plate 3, as shown in FIG. 3. The guide 30 plays a role in fixing the bubble plate 3, a porous plate 5, and a cassette (not shown) on which the substrate is provided. The guide 30 is fixed to the etching tank's inner surface via a bolt.

A method for etching the glass substrate of the LCD panel using the aforementioned related art etching device will be described below.

A glass substrate is placed on a porous plate 5. The etching solution stored in the etching solution mixing tank 9 then passes through the bubble plate 3 via an etching solution supply pipe 7 and is thereby evenly provided on the glass substrate through the holes in the porous plate 5. At this time, nitrogen gas injected into the bubble plate 3 through the air supply pipe 15 passes through the holes of the porous plate 5 forming nitrogen bubbles. These nitrogen bubbles are provided to the glass substrate, thereby eliminating impurities on the surface of the glass substrate.

A filter formed in the etching solution discharge pipe 11 eliminates impurities in the etching solution. The cleaned etching solution is provided to a buffer tank 13 and is subsequently stored in the etching solution mixing tank 9, thereby restarting the circulation.

The aforementioned related art etching apparatus has several problems.

The bubble plate 3 needs to be cleaned and/or replaced regularly as it becomes clogged with sludge generated during the etching process. In order to clean and/or replace the bubble plate 3, it needs to be separated from the etching tank 1. This is done by removing a bolt attaching the guide to the etching tank, after which the etching plate can be removed. After the cleaning and/or replacement, an assembly process should be performed in the opposite order.

The cleaning and/or replacement of the etching plate increases the process time required in the manufacturing of LCD devices. Additionally, workers may be exposed to toxic etchants, such as hydrofluoric acid (HF). Also, defective reassembly may occur, such as the guide being abnormally positioned in the tank, creating etching inferiority and/or substrate damage.

SUMMARY OF THE INVENTION

Accordingly, the present invention is directed to an etching apparatus and etching process using the same that substantially obviates one or more of the problems due to limitations and disadvantages of the related art.

An advantage of the present invention is to provide a cleanable and/or replaceable bubble plate without separating the guide in the etching apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention as embodied and broadly described, a bubble plate for etching and an etching apparatus using the same includes a plurality of air tubes having a plurality of holes and being arranged in a straight line with a constant interval and a straight frame having an air path and being connected to both ends of the air tube. The bubble plate of the present invention includes a pair of straight frames so as to be easily separated from the etching apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
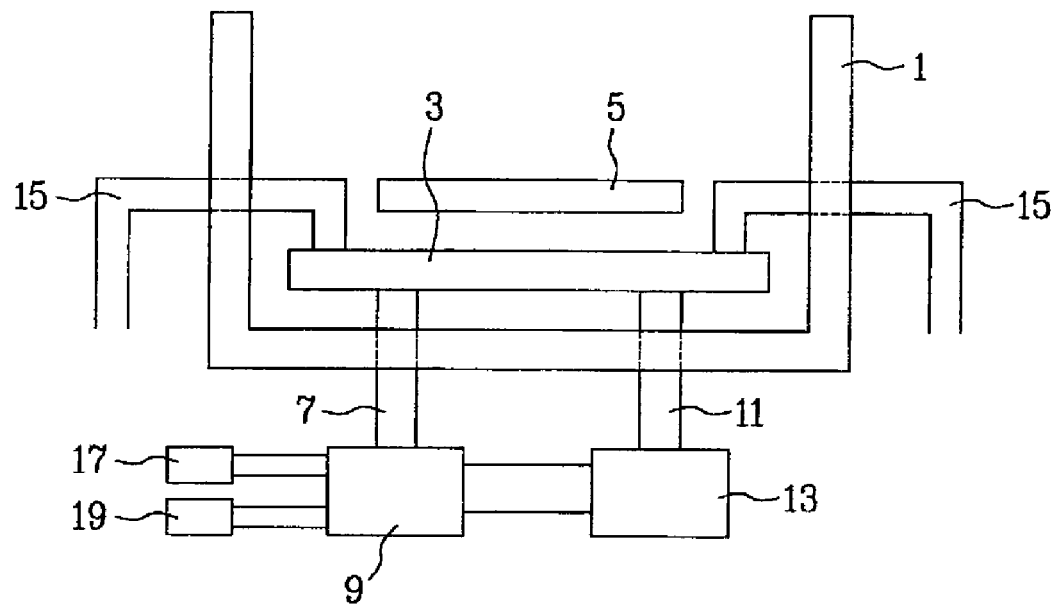
FIG. 1 illustrates a simplified sectional view of an etching apparatus of the related art.
Figure 2:
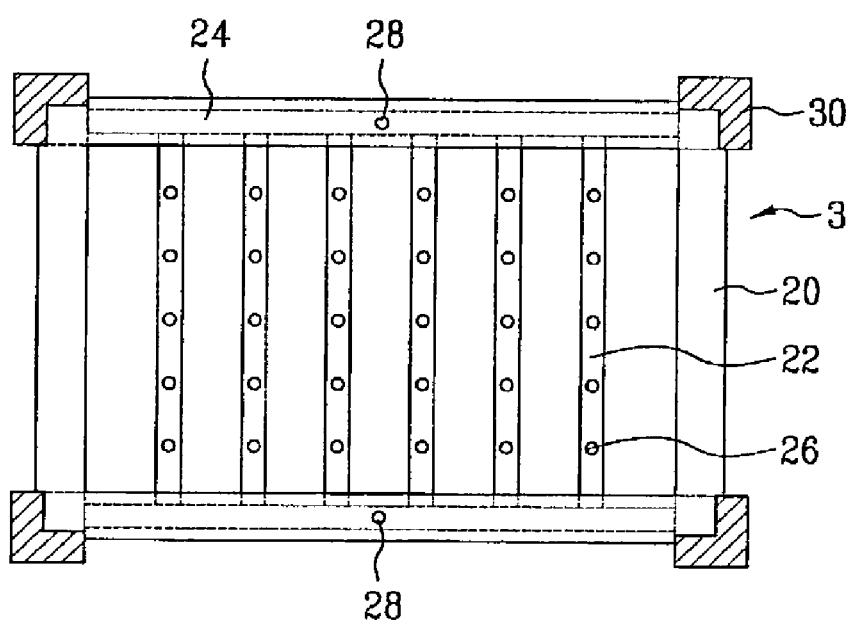
FIG. 2 illustrates a plane view of an etching apparatus of the related art with a bubble plate being fixed thereto by a guide.
Figure 3:
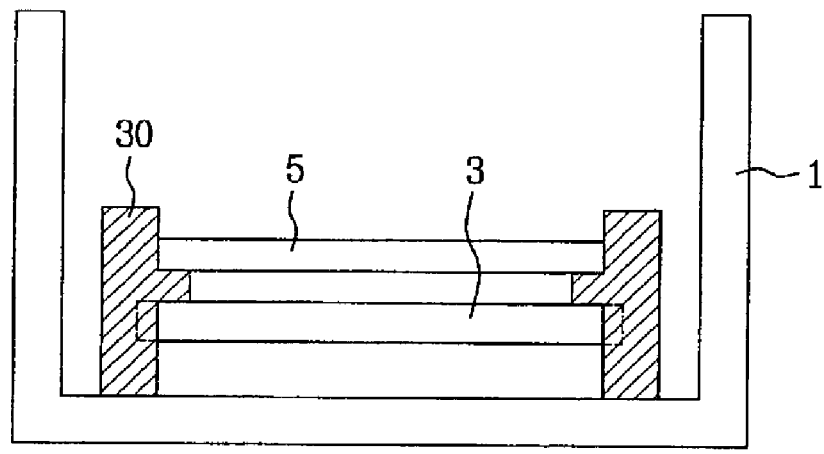
FIG. 3 illustrates a sectional view of an etching apparatus of the related art with a bubble plate being fixed thereto by a guide.
Figure 4:
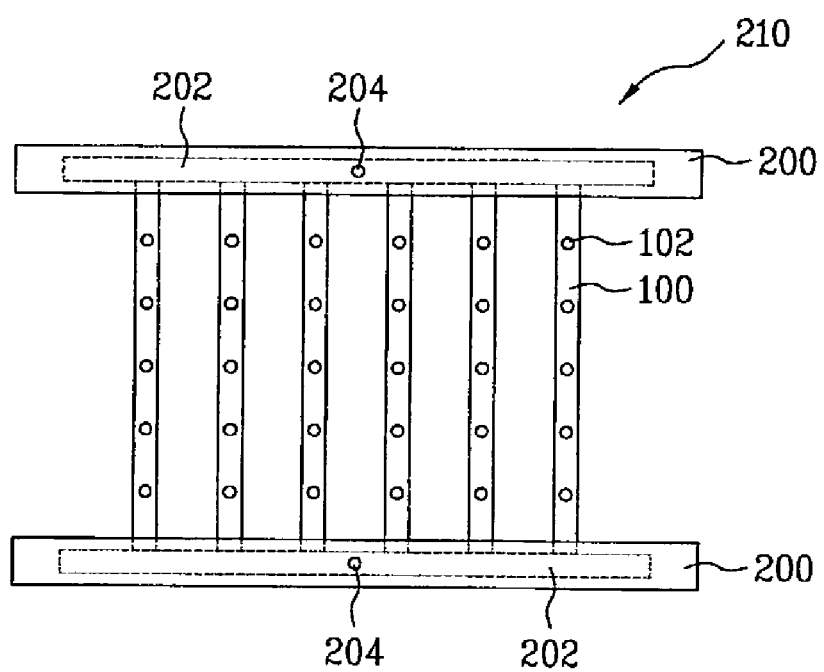
FIG. 4 illustrates a plane view of a bubble plate for an etching apparatus in accordance with the present invention.

FIG. 4 illustrates a plane view of a bubble plate for an etching apparatus in accordance with the present invention. Referring to FIG. 4, the bubble plate 210 of the present invention includes a plurality of air tubes 100 having a plurality of holes 102 on their surfaces that are arranged at substantially constant intervals in a straight line. A pair of straight frames 200 each having an air path 202 therein is connected to both ends of the plurality of air tubes 100.

The related art bubble plate consists of a rectangular frame and an air tube formed in the rectangular frame. In contrast, the bubble plate 210 of the present invention includes a pair of straight frames 200 and a plurality of air tubes 100 being connected thereto, capable of being easily separated from the etching apparatus. The air tubes 100 provide a tension force thereby releasably securing the frames of the bubble plate 210 to the guide 300. The following is a more detailed description of the etching apparatus according to the present invention.

Figure 5A:
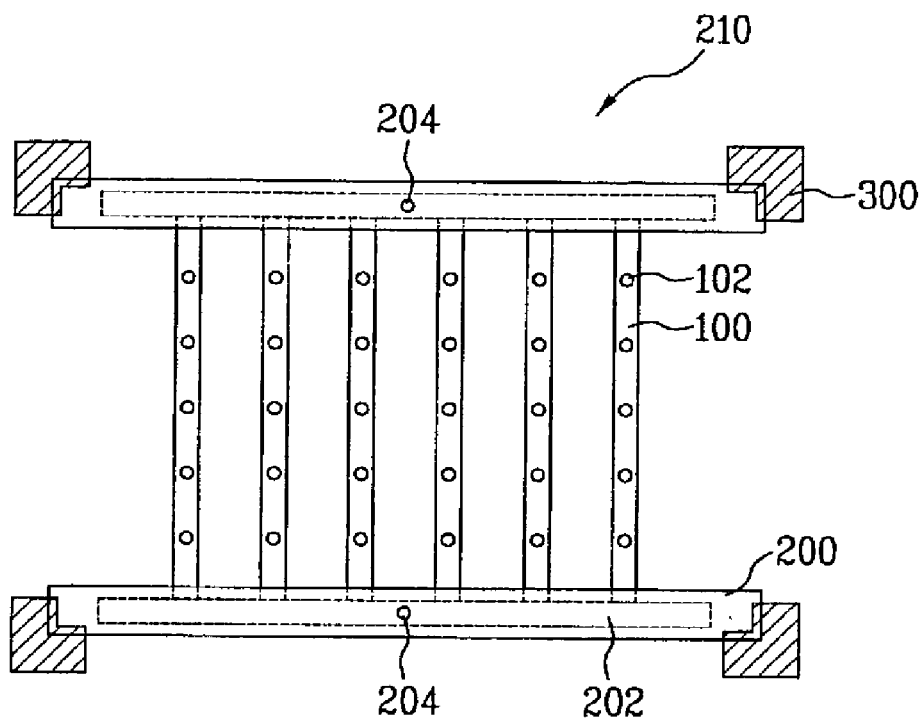
FIG. 5A illustrates a plane view of an etching apparatus with a bubble plate being fixed thereto by a guide in accordance with the present invention.

FIG. 5A illustrates a plane view of an etching apparatus with a bubble plate 210 abutting the guide 300 in accordance with the present invention. Referring to FIG. 5A, the bubble plate 210 is releasably secured to the etching apparatus by a guide 300 formed on both ends of the straight frames 200. The guide 300 is attached or fixed to the bottom of the etching apparatus.

Figure 5B:
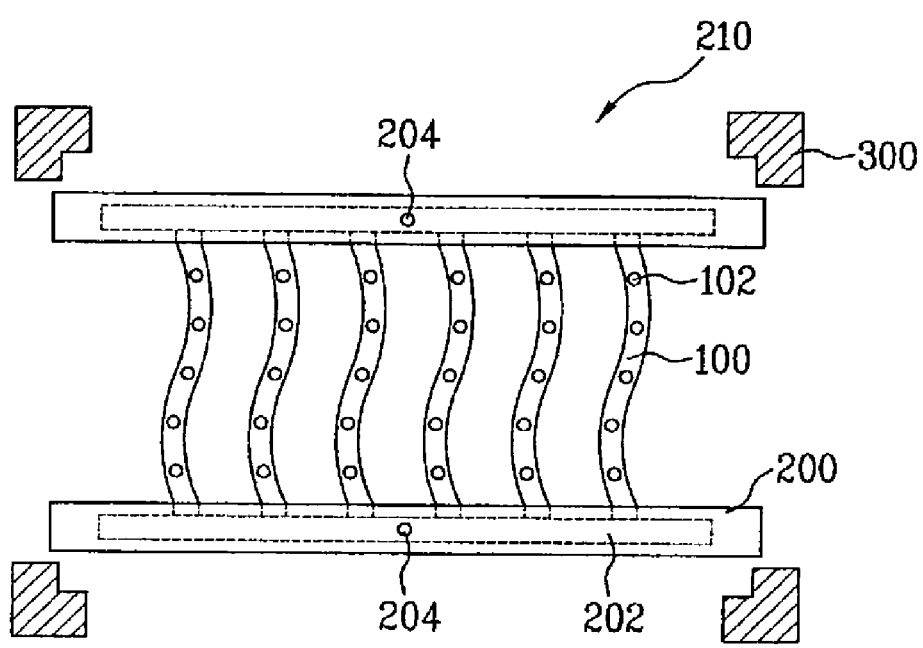
FIG. 5B illustrates a plane view of an etching apparatus with a bubble plate being separated therefrom in accordance with the present invention.

FIG. 5B illustrates a plane view of an etching apparatus with a bubble plate being separated therefrom in accordance with the present invention. Referring to FIG. 5B, in order to separate the bubble plate 210 from the etching apparatus, the frames 200 are compressed making the overall width of the bubble plate 210 narrower. In this way, the bubble plate 210 may be removed from the etching apparatus without removing any parts. This provides a significant advantage when compared to the related art etching apparatus and obviates the problems in the related art.

The air tube 100 should be made of a flexible material in order to prevent damage from the compression. A number of different flexible materials, for example, polyvinyl chloride, and the like, may be suitable material for the air tube 100.

An air path 202 provides air to the air tube 100 and is formed inside the frames 200. A hole 204 connects the air path 202 to an external air supply device, thereby allowing airflow into the air path 202 and frames 200.

Figure 6:
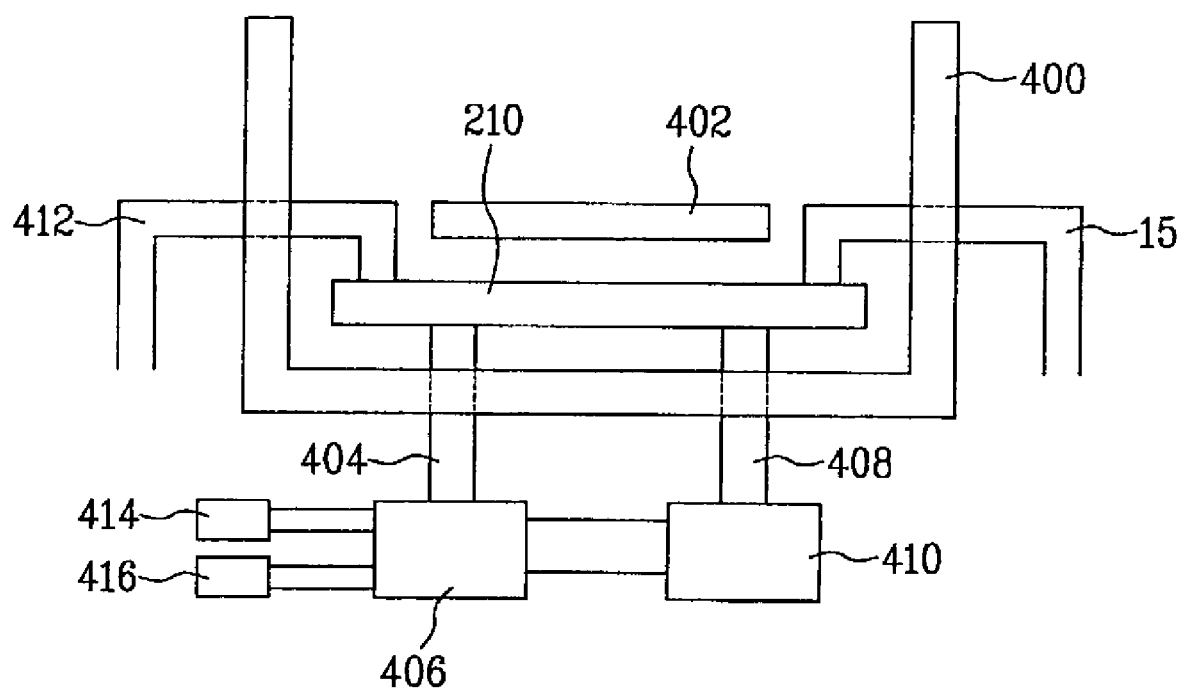
FIG. 6 illustrates a simplified sectional view of an etching apparatus of the present invention.

FIG. 6 is a simplified sectional view of an etching apparatus according to the present invention. Referring to FIG. 6, the etching apparatus of the present invention includes an etching tank 400 for holding the etching solution, a guide (not shown) attached or fixed to the bottom face of the etching tank 400, and a bubble plate 210 supported by the guide.

The bubble plate 210 has the same structure and material as those of the above-described bubble plate.

The etching apparatus of the present invention further comprises a porous plate 402 formed on the bubble plate 210, an etching solution mixing tank 406, a buffer tank 410, and an air supply pipe 412. The porous plate 402, bubble plate 210, mixing tank 406, buffer tank 410 and air supply pipe are in communication with the bubble plate 210. The etching solution mixing tank 406 supplies etching solution to the bubble plate 210. The buffer tank 410 stores etching solution from which impurities are eliminated after being used for etching. The air supply pipe 412 provides air to the bubble plate 210.

The etching solution mixing tank 406 is connected to a DI water supply part 414, an undiluted etching solution supply part 416, the etching solution supply pipe 404, and the buffer tank 410. The DI water supply part 414 supplies DI water to the etching solution mixing tank 406. The undiluted etching solution supply part 416 supplies undiluted etching solution to the etching solution mixing tank 406. The etching solution mixing tank 406 can store the undiluted etching solution, DI water, and the etching solution from the buffer tank 410, from which impurities are eliminated, in a mixed state.

The concentration of the etching solution stored in the etching solution mixing tank 406 may be 0 to 100 percent of the undiluted etching solution. Beneficially, the concentration of etching solution being stored in the mixing tank is about 50 percent or less.

The concentration of the etching solution may be regulated by controlling the amount of the DI water, the amount of undiluted etching solution, and the amount of recycled etching solution from the buffer tank 410. Optionally, a concentration measuring device may be installed in the mixing tank 406.

An etching process according to the present invention will be described below.

A glass substrate is arranged on a porous plate 402. The etching solution stored in an etching solution mixing tank 406 then passes through a bubble plate 210 via an etching solution supply pipe 404. The plurality of holes arranged on the porous plate 402 enable the etching solution to be evenly distributed onto the glass substrate. At this time bubbles are provided to the glass substrate, thereby eliminating impurities on the glass substrate. The bubbles are formed by nitrogen gas injected into the bubble plate 210 through an air supply pipe 412 that passes through the holes of the porous plate 402.

The impurities in the etching solution are eliminated by a filter arranged on the etching solution discharge pipe 408. The etching solution with the impurities removed is provided to the buffer tank 410 and then stored in the etching solution mixing tank 406, thereby recycling the etching solution.

Hydrofluoric acid (HF) is preferred as the etching solution. The etching process is performed by an exothermic reaction of the glass substrate and the etching solution. Additionally, the etching rate and thickness to be etched (i.e., thickness of the glass substrate to be etched) is adjusted by controlling the temperature change during the exothermic reaction. That is, a temperature sensor inside the etching tank 400 measures the temperature change, thereby enabling control during the etching process.

The etching apparatus of the present invention is a significant improvement when compared to the related art apparatus. For example, there is a low possibility of a worker being exposed to harmful chemicals such as HF acid. As the bubble plate is easily separated and attached to and from the etching apparatus, the guide does not have to be separated from the etching apparatus in order to remove the bubble plate. Accordingly, etching uniformity is improved and sludge does not flow into a bolt fastening part of the guide.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display etching apparatus, comprising:
an etching tank having a bottom and sidewalls;
a guide arranged on the bottom of the etching tank; and
a bubble plate being supported by the guide, the bubble plate includes a plurality of air tubes and a first frame and a second frame separate from and opposite each other, each of said frames having an air path, wherein one end of each of the plurality of air tubes is connected to the first frame, and the other end of each of the plurality of air tubes is connected to the second frame,
wherein the interval between the first and second frames is narrowed and then the bubble plate is separated and attached from and to the guide;
wherein at least one of said air tubes is connected in place by a tension force between the first and second frames attached to the guide, and is bent when separating and attaching the bubble plate from and to the guide.

2. The etching apparatus of claim 1, wherein the frames have an internal air path.

3. The etching apparatus of claim 1, wherein the air tubes are formed of a flexible material.

4. The etching apparatus of claim 3, wherein the air tubes are formed of polyvinyl chloride.

5. The etching apparatus of claim 1, wherein the frames each includes a hole.

6. The etching apparatus of claim 1, further comprising:
a porous plate on the bubble plate.
an etching solution mixing tank connected to the bubble plate for providing the etching solution;
a buffer tank connected to the bubble plate for storing the etching solution; and
an air supply pipe connected to the bubble plate.

7. The etching apparatus of claim 1, further comprising:
a DI water supply part connected to the etching solution mixing tank for providing DI water to the etching solution mixing tank; and
an undiluted etching solution supply part connected to the etching solution mixing tank for providing undiluted etching solution.

8. The etching apparatus of claim 1, further comprising a temperature sensor in the etching tank.

9. The etching apparatus of claim 1, further comprising a concentration sensor in the etching tank.

10. A liquid crystal display etching apparatus comprising:
an etching tank having a bottom and sidewalls;
a concentration sensor arranged in the etching tank;
a temperature sensor arranged on the etching tank;
a guide arranged on the bottom of the etching tank; and
a bubble plate being supported by the guide, wherein the bubble plate includes a plurality of air tubes of flexible material, having a first frame and second frame separate from and opposite each other, each of said frames having an air path, wherein one end of each of the plurality of air tubes is connected to the first frame, and the other end of each of the plurality of air tubes is connected to the second frame;
a porous plate arranged on the bubble plate;
an etching solution mixing tank in liquid communication with the bubble plate;
a buffer tank in liquid communication with the bubble plate;

a deionized (DI) water supply part connected to the etching solution mixing tank for providing DI water to the etching solution mixing tank; and an undiluted etching solution supply part connected to the etching solution mixing tank for providing undiluted etching solution, wherein the interval between the first and second frames is narrowed and then the bubble plate is separated and attached from and to the guide;

wherein at least one of said air tubes is connected in place by a tension force between the first and second frames attached to the guide, and is bent when separating and attaching the bubble plate from and to the guide.

11. The etching apparatus of claim 10, wherein the air tubes are formed of polyvinyl chloride.

12. The etching apparatus of claim 10, wherein at least one of the frames abut the guide.

* * * * *